US00RE48414E

(19) United States
(12) Reissued Patent
Kiest

(10) Patent Number: US RE48,414 E
(45) Date of Reissued Patent: Feb. 2, 2021

(54) ANHYDROUS AMMONIA FERTILIZER LIQUID AND VAPOR SEPARATOR

(71) Applicant: 360 Yield Center, LLC, Tremont, IL (US)

(72) Inventor: Lauren J. Kiest

(73) Assignee: 360 Yield Center, LLC, Morton, IL (US)

(21) Appl. No.: 15/067,085

(22) Filed: Mar. 10, 2016

Related U.S. Patent Documents

Reissue of:
(64) Patent No.: 8,667,916
Issued: Mar. 11, 2014
Appl. No.: 13/162,577
Filed: Jun. 16, 2011

U.S. Applications:
(60) Provisional application No. 61/355,523, filed on Jun. 16, 2010.

(51) Int. Cl.
*A01C 23/00* (2006.01)
*A01C 23/02* (2006.01)

(52) U.S. Cl.
CPC ..... *A01C 23/024* (2013.01)

(58) Field of Classification Search
CPC ..... A01C 23/024; B01D 19/0042; B01D 19/0413
See application file for complete search history.

(56) References Cited

U.S. PATENT DOCUMENTS 3,054,726 A * 9/1962 Fields et al. ..... 95/168
3,556,027 A 1/1971 Ammann
3,947,574 A 3/1976 Jaggers et al.
3,950,401 A 4/1976 Petrille et al.
3,954,942 A 5/1976 Achorn et al.
3,978,681 A 9/1976 Kjelgaard et al.
3,990,662 A 11/1976 Wallace
4,069,029 A 1/1978 Hudson
4,169,677 A 10/1979 Luria
4,175,394 A 11/1979 Wiesboeck
4,196,677 A * 4/1980 Siebert ..... A01C 23/024 111/119
4,202,283 A 5/1980 Wiesboeck
(Continued)

FOREIGN PATENT DOCUMENTS

CA 001199529 A * 1/1986 ..... A01C 23/024

*Primary Examiner* — Jeffrey L Gellner
(74) *Attorney, Agent, or Firm* — Thomas J. Oppold; Larkin Hoffman Daly & Lindgren Ltd.

(57) ABSTRACT

The vapor exhaust assembly, for anhydrous ammonia, includes a closed filter tower and a closed exhaust tower with vertical tubes. The filter tower is connected to the vapor tower by a vapor upper pipe and a liquid lower pipe. A filter tube is mounted in the filter tower. Ammonia enters the filter tower above an open end of the filter. Ammonia vapor moves from the filter tower through the vapor upper pipe to a vapor chamber in the vapor tower. Liquid moves from the filter tower through the liquid pipe to the vapor tower. Liquid received in the vapor tower is moved upward by a dam. Vapor in the liquid moves upward to the vapor chamber. Liquid moves downward from the dam top to a liquid discharge exit. A vapor discharge valve in the top of the vapor tower is opened to discharge vapor and increase liquid in both towers.

27 Claims, 4 Drawing Sheets

(56) References Cited

U.S. PATENT DOCUMENTS

| | | | | |
|---|---|---|---|---|
| 4,310,344 | A | 1/1982 | Kjelgaard et al. | |
| 4,310,555 | A | 1/1982 | Kjelgaard et al. | |
| 4,341,168 | A | 7/1982 | Siebert | |
| 4,385,500 | A | 5/1983 | Kjelgaard et al. | |
| 4,458,609 | A | 7/1984 | Tofte | |
| 4,657,568 | A | 4/1987 | Jones | |
| 4,900,339 | A | 2/1990 | Ward et al. | |
| 5,845,592 | A | 12/1998 | Ridgley | |
| 5,967,066 | A | 10/1999 | Giles et al. | |
| 6,117,217 | A | 9/2000 | Jones | |
| 6,142,177 | A | 11/2000 | Jones | |
| 6,269,757 | B1 * | 8/2001 | Kiest | A01C 23/024 111/119 |
| 6,283,049 | B1 | 9/2001 | Swanson | |
| 6,283,079 | B1 | 9/2001 | Cumming et al. | |
| 7,096,802 | B1 * | 8/2006 | Kiest | 111/119 |
| 8,206,470 | B1 * | 6/2012 | Jacobson | 44/387 |

* cited by examiner

ANHYDROUS AMMONIA FERTILIZER LIQUID AND VAPOR SEPARATOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application claims the benefit of the filing date of U.S. Provisional Application No. 61/355,523, titled IMPROVEMENTS TO AN ANHYDROUS AMMONIA FERTILIZER SEPARATOR FOR LIQUID AND VAPOR filed Jun. 16, 2010.

TECHNICAL FIELD

The present invention relates improvements to an apparatus and method for providing vapor free liquid to an anhydrous ammonia flow control system, as described by U.S. Pat. No. 7,096,802. More particularly, the invention relates to changes which improve the exhaust of gaseous ammonia from the liquid stream and improve filtering of rust and trash from the anhydrous ammonia stream. This apparatus and method utilizes a vapor exhaust system composed of two towers. The first tower contains a filter basket for filtering solid impurities. The first tower also pre separates the incoming ammonia stream into separate liquid and gaseous streams, feeding them separately to the vapor exhaust tower

BACKGROUND OF THE INVENTION

Injection of anhydrous ammonia into the soil is a commonly used method of supplying nitrogen fertilizer to grain and other crops using an applicator vehicle pulled by a tractor. An ammonia storage tank is pulled behind the applicator. A hose connects the storage tank to the distribution system on the applicator. The distribution system splits the ammonia into separate lines which feed multiple knives. These knives are lowered into the soil several inches and ammonia is injected into the ground at the bottom of the knives as the knives are pulled through the soil. It is normally desired that ammonia be applied uniformly over a field. One of the main problems is achieving this uniformity is difficulty in controlling a stream of mixed liquid and vaporous ammonia. Vaporous ammonia causes flow sensors to supply incorrect data and causes pump designs to become vapor locked. Cooling of the ammonia in a heat exchanger and pressurizing ammonia above its boiling point with a pump are methods of keeping liquid anhydrous ammonia below its saturation temperature.

The apparatus and method for providing vapor free liquid to an anhydrous ammonia flow control system, as described by U.S. Pat. No. 7,096,802 is a method of providing a liquid ammonia stream. This method separates the ammonia vapor from liquid ammonia in a tower with liquid level controlled valve. The method is analogous to a common stream trap which separates condensed water from a steam line. The commercial embodiment of the method described in U.S. Pat. No. 7,096,802 is the Liquimatic® vapor separator which has been in service since June, 2009. While it performed well in field operation, it was subject to occasional filter plugging. Also, there were some instances where entrained liquid anhydrous ammonia exited through the vapor exit lines on the separator.

SUMMARY OF THE INVENTION

The method and apparatus of the present invention incorporates a large basket filter in a tower preceding the vapor exhaust tower. Anhydrous ammonia from the storage tank flows into the top of filter tower. The filter in the tower has greater length, approximately 18 inches than the previously used commercial basket filter. A nominal 2 inch diameter, 5.5 inch length filter basket such as in the BS35S020-P basket filter, manufactured by Titan Flow Control, Inc. of Lumberton, N.C. 28358, has been used for filtration of rust and other trash. Because the length of the tower's filter basket exceeds that of the previously used commercial 2 inch diameter filter, the filter tower can operate significantly longer, having greater surface area to hold trash from the storage tank and a greater volume for collection of trash. Anhydrous ammonia storage (nurse) tanks used on farms typically contain a significant amount of trash, particularly rust. Filter plugging occurs occasionally so a larger filter area allows longer periods between filter cleanings. This is important to farmers who often have a short time window to apply anhydrous ammonia.

Liquid anhydrous ammonia in the storage tank is a saturated liquid at its vaporization temperature. As the liquid stream passes through valves, fittings and a connecting hose to the applicator system it experiences a pressure loss due to friction in the hose. Because of the lowered pressure some liquid ammonia vaporizes to cool the liquid to the saturation temperature associated with that lower pressure. This changes the liquid stream into a mixture of liquid and vapor phases. The greater the pressure drop, the greater is the ratio of vapor to liquid. Anecdotal evidence suggests that application rates near 600 lbs/hr of anhydrous cause a temperature drop of less than 1° F. using 1¼" inside diameter connecting hoses. Smaller hoses and fittings would increase the temperature drop as would higher rates of application. Assuming a 1° F. drop from the storage tank to the exhaust chamber, approximately 0.2% by weight of ammonia vapor would be created. This is about 25% by volume.

Commercial embodiments of the method described in U.S. Pat. No. 7,096,802 have been constructed from 24 inch lengths of steel pipe, both five and six inch nominal diameter. Ammonia from the storage tank, passing through a basket filter, enters on one side of the tower on a centerline about 4 inches above the bottom of the tower. The liquid and vapor go up the tower, over a dam about six inches high starting at the tank bottom. The liquid ammonia goes over the weir, then down to an exit on a centerline about 4 inches above the bottom of the tower. The entrance and exit for ammonia liquid are on opposite side of the tower. Ammonia vapor goes up the tower, collecting in a vapor head space. It is to be noted that at the top of the tower, vapor and liquid are in thermodynamic equilibrium at the boiling point for the pressure at that location. A float switch at the top of the chamber operates a solenoid valve on the outside top of the tower. As the anhydrous vapor collects in the head space the float goes down, putting the switch in a closed position, opening the solenoid valve. Vapor escapes the tower causing the liquid level to rise, putting the switch in an open position, closing the solenoid valve. Because the vapor exiting the tower is at a relatively high pressure, the exit line need not be the large diameter required by a typical heat exchanger system. The small amount of vapor exiting can be easily handled by a ⅜" inside diameter steel tube conveying the vapor to soil.

In normal operation, rust and other trash from the storage tank fill the filter basket, eventually stopping flow to the tower. Because the time period for application of anhydrous ammonia is short because of weather dependence, applicator operators want as few work stoppages as possible. The commercial embodiment described above has used basket filters from various filter suppliers. Typically, a filter such as the BS35S020-P basket filter, manufactured by Titan Flow Control, Inc., has an effective length of 5.5 inches and a diameter of 2 inches.

In the method and apparatus of the present invention, the tower holding the basket filter is a nominal three inch pipe, 24 inches long. The filter basket has an effective length of 18 inches and a diameter of 2 inches. Both the surface area and the volume are increased to 290% of the Titan filter.

The commercial embodiment of the method as described in U.S. Pat. No. 7,096,802 occasionally experienced problems with incomplete exhaust of liquid and vapor. Liquid mist and droplets could be observed in the effluent from the solenoid valves. This phenomenon occurred most often at very high rates of anhydrous flow. Vapor bubbles rising in the liquid in the tower caused liquid entrainment in the vapor and created turbulence which adversely affected operation of the float switches. Field modifications were made consisting of a weir inside the top of the tower to divert entrainment of liquid and a cage to contain the float of the float switch so that it was not disturbed by turbulence.

The apparatus and method of the present invention utilizes two towers rather than one. The first tower in the flow sequence, the filter tower, contains a basket filter to remove trash. This filter tower also largely separates the flow of ammonia into a vapor stream and a liquid stream. There are two exit paths from the filter tower, the upper one carrying mostly vapor and the lower one carrying mostly liquid. The liquid enters the bottom of the second tower, goes over a weir at the bottom of the tower and exits on the opposite side of the tower. Vapor passing through the upper path goes directly to a vapor head space in the vapor exhaust tower. Because the vapor and liquid are not closely intermixed, there is very little entrainment and turbulence is greatly reduced in the vicinity of the float switch.

While the described improvements are not essential to the success of the previously described commercial embodiment of an anhydrous vapor separator, they improve operation and ease of use.

The anhydrous ammonia fertilizer liquid and vapor separator includes a liquid anhydrous ammonia storage tank pressurized by anhydrous ammonia vapor pressure. The vapor pressure moves anhydrous ammonia through the system without the aid of pumps. A vapor exhaust assembly is connected to the liquid anhydrous ammonia storage tank by a delivery conduit. The conduit delivers anhydrous ammonia to the anhydrous ammonia liquid and vapor separator. An ammonia flow meter is connected to the anhydrous ammonia liquid and vapor separator by a liquid ammonia conduit. The ammonia flow meter controls a flow control valve that adjusts the ammonia application rate to the soil. The application rate may be varied from one location in a field to another location in a field based on data such as soil samples and crop yield variations from location to location of previous crops that were harvested. The flow meter accurately measures flow rates of liquid ammonia without mixed ammonia vapor. A distribution manifold is connected to and receives ammonia from the liquid ammonia flow meter. A plurality of hoses are connected to the distribution manifold. Each hose receives liquid ammonia from the distribution manifold and delivers ammonia to a soil cutting knife for injection into soil. The distribution manifold delivers liquid ammonia at substantially the same rate to each of the plurality of hoses. Ammonia vapor in the distribution manifold is avoided to obtain the same flow rate in each of the plurality of hoses.

The vapor exhaust assembly includes a filter tower with a filter tower vertical tube. The filter tower has a tube closed top and a tube closed bottom. A stainless steel filter tube is mounted inside the filter tower vertical tube. The filter tube cleans the ammonia received from the storage tank. The filter tube has a substantial diameter and length to increase the interval between filter tube cleaning. A filter tower inlet through the filter tower vertical tube is positioned below the tube closed top and above a filter open top end of the stainless steel filter screen tube. A filter tower liquid ammonia outlet through the filter tower vertical tube is above the tube closed bottom and adjacent to a filter closed bottom end of the stainless steel filter tube.

The vapor exhaust assembly also includes a vapor exhaust tower with an exhaust tower vertical tube. The exhaust tower liquid ammonia inlet is above the exhaust tower closed bottom and is connected to the filter tower liquid ammonia outlet. A dam is connected to the vapor exhaust tower closed bottom, an exhaust tower inside wall and has a dam top edge. All of the liquid ammonia passing through the exhaust tower liquid ammonia inlet passes above the dam top edge. The liquid ammonia exit conduit through the exhaust tower vertical tube is located below the dam top edge and on a downstream side of the dam. An ammonia vapor upper pipe is connected to the filter tower below the filter open top end of the stainless steel filter tube and connected to the exhaust tower vertical tube above the dam top edge. A vapor discharge valve is attached to the exhaust tower closed top. A vapor discharge tube is connected to the vapor discharge valve and extends to one of the soil cutting knives. An ammonia liquid level sensor is attached to the exhaust tower closed top. The liquid level sensor opens the vapor discharge valve when an upper surface of liquid ammonia falls below selected elevation.

Vapor discharged through the vapor discharge valve is limited to the extent possible to prevent excessive fertilizer application by one knife. However, the ammonia vapor that is discharged carries heat from the vapor discharge tube and cools the liquid ammonia conveyed to the manifold. Reducing ammonia temperature reduces the production of ammonia vapor.

BRIEF DESCRIPTION OF DRAWINGS

These and other objects, features and advantages of this invention will become readily apparent in view of the following detailed description of the preferred embodiments and best mode, appended claims and accompanying drawings, in which:

DETAILED DESCRIPTION OF THE PREFERRED EMBODIMENTS

Figure 1:
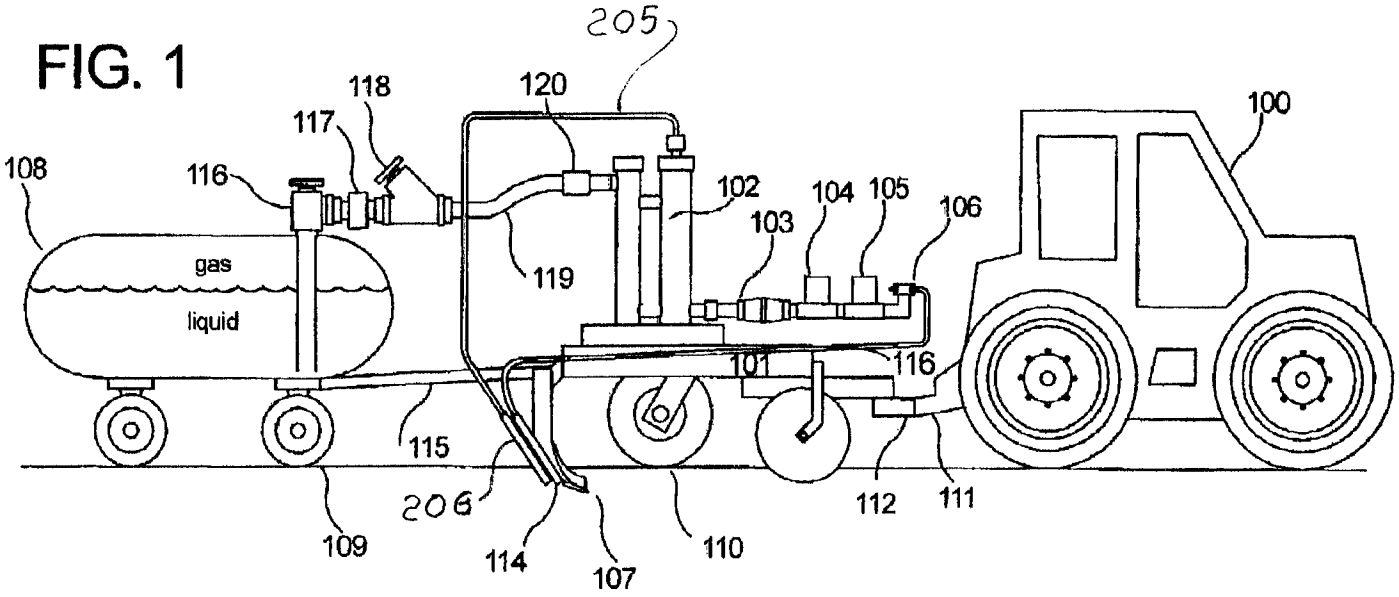
FIG. 1 is a side elevation of the apparatus of the present invention being pulled behind a tow vehicle.

Referring first to FIG. 1, the apparatus of the present invention is shown being pulled behind a tow vehicle 100 which could be a tractor, truck, or the like. The apparatus includes a toolbar applicator frame 101 which supports a vapor exhaust assembly 102, a flow meter 103, an electrically operated flow control valve 104, an electrically operated shut off valve 105, a distribution manifold 106, a plurality of soil cutting knives 107, and a storage tank 108 supported on a plurality of wheels 109 and towed behind the toolbar applicator frame 101. The toolbar applicator frame 101 is itself supported on a plurality of wheels 110 and has a tongue 112 that is pivotally connected to a hitch 111 on the rear of the tow vehicle 100. In the preferred embodiment, the toolbar applicator frame 101 is a Progressive series 1300 anhydrous ammonia toolbar, manufactured by Progressive Farm Products, Inc. of Hudson, Ill. It is configured by Progressive for "strip till" ammonia application. Multiple knives 107 are suspended from the frame 101, with there being typically 8, 12, 16 or more of the knives 107 attached to a toolbar applicator frame 101, which is adapted to raise or lower the knives 107 into the soil. Each knife 107 includes at least one injector nozzle 114 through which the ammonia can be emitted into the soil when the knife 107 is lowered into the soil.

The storage tank 108 is a pressurized tank that is commercially available and retains a predetermined quantity of fertilizer which may be, by way of illustration, anhydrous ammonia. The storage tank 108 is on a trailer that also has a tongue 115 that is pivotally connected to the toolbar applicator frame 101.

As shown clearly in FIG. 1, a main delivery or exit hose 119 passes from the supply tank 108 after an appropriate manually-operable shutoff valve 116, a quick connect acme coupling 117, and a globe valve 118 attached to the hose 119, thence to a breakaway coupling 120 on the toolbar applicator frame 101. The main delivery hose 119 would be, by way of example, a 1.5" internal diameter ("I.D.") reinforced neoprene-lined hose. The breakaway coupling 120 follows the main delivery hose 119. A short hose of the same type as the main delivery hose connects to the entry point to the vapor exhaust assembly 102 from the breakaway coupling 120. Liquid exits the bottom of the vapor exhaust assembly 102, going to the flow meter 103, then to the servo valve 104 and finally a shut off valve 105. The flow meter 103 senses ammonia liquid flow and sends a signal to the controller in the cab of the tow vehicle 100. The controller operates the servo valve 104, controlling flow. The shut off valve 105 opens when anhydrous is to be applied and closes at the end of the row. Flow from the shut off valve 105 is divided by a manifold 106, then through hoses to the knives or openers 107 through small diameter EVA hoses 116.

Figure 2:
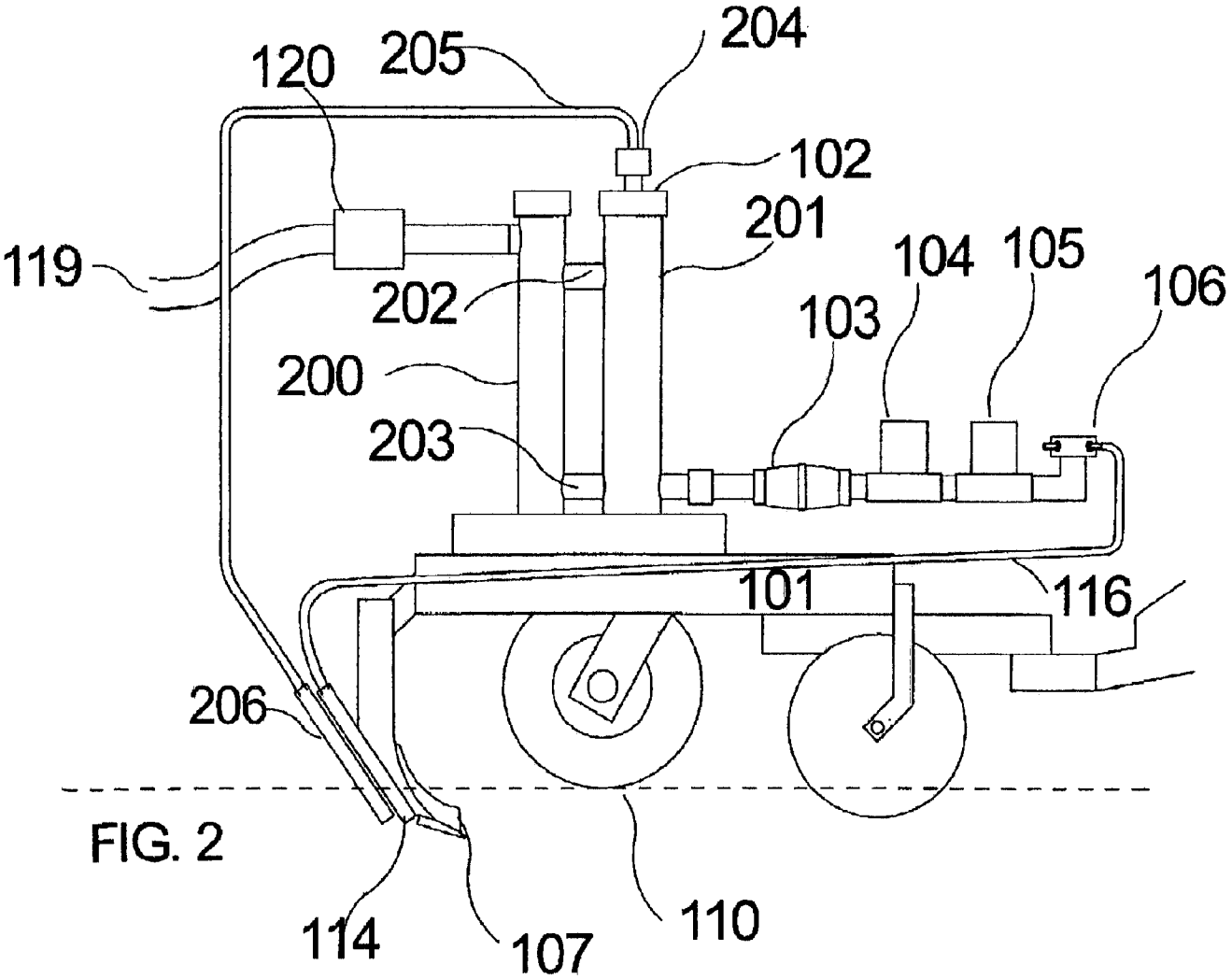
FIG. 2 is a fragmentary side elevation of the apparatus of the present invention.

Referring to FIG. 2, ammonia entering the vapor exhaust assembly 102 from the breakaway coupling 120 enters the filter tower 200, liquid ammonia leaving the filter tower 200 through a lower exit pipe 203 to the bottom of the vapor exhaust tower 201. Ammonia vapor leaves the filter tower 200 through an upper exit pipe 202 to the top of the vapor exhaust tower 201. Ammonia vapor leaves the top of the vapor exhaust tower 201 through a solenoid valve 204 controlled by a liquid level sensor 312. It then passes through a length of tubing 205 to a separate steel tube 206 in back of the injector tube 114 on the opener 107. Liquid ammonia leaves the bottom of the vapor exhaust assembly as described in FIG. 1.

Figure 3:
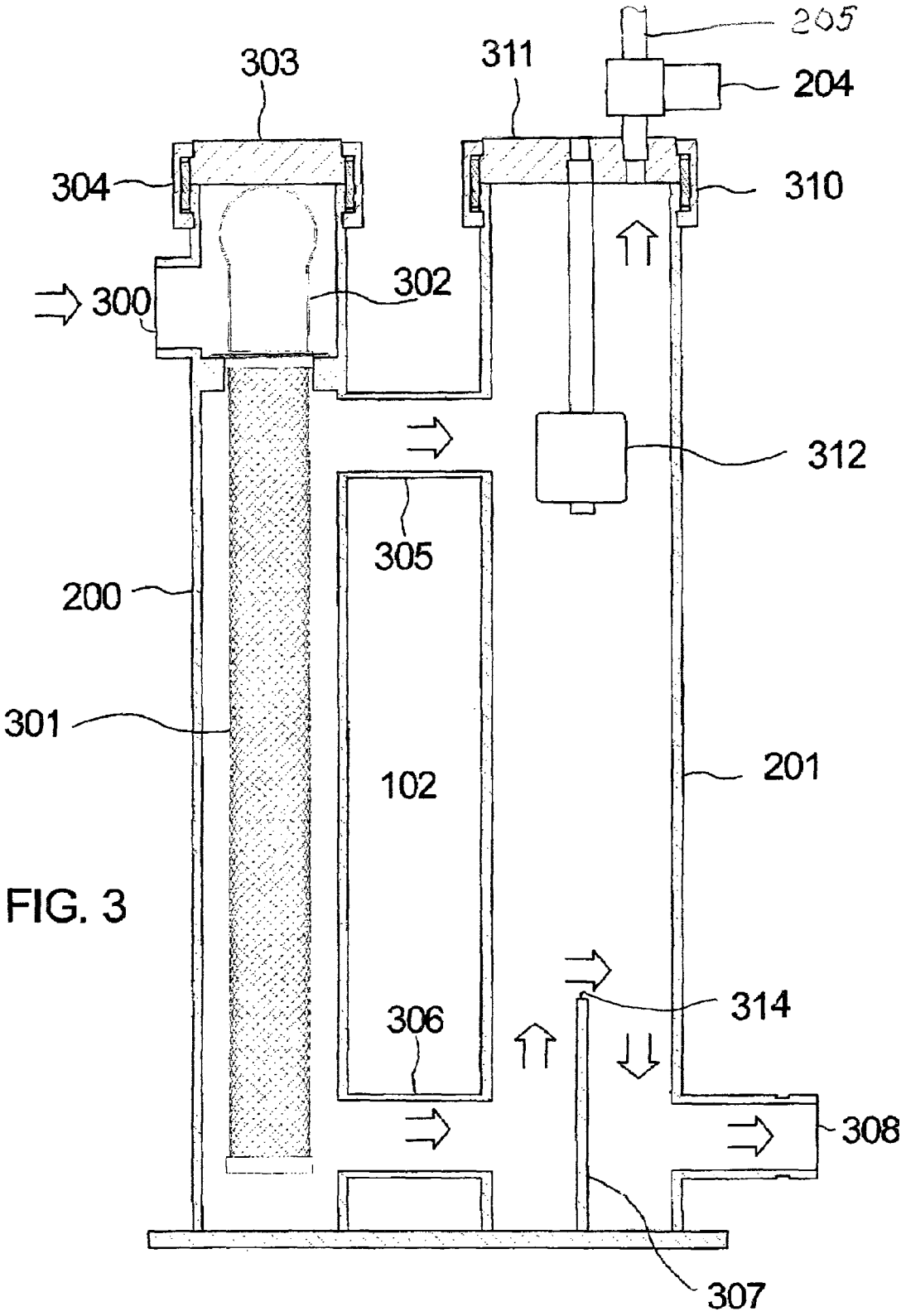
FIG. 3 is a sectional view of the vapor exhaust assembly.

Referring to FIG. 3, ammonia liquid and vapor feed to the vapor exhaust assembly 102 enters at the inlet 300 to the filter tower 200 which has an inside diameter of 3 inches and a height of 24 inches. Flow then goes down through a filter 301 consisting of a stainless steel screen, 30 mesh for example, backed by a perforated stainless steel sheet. The filter 301 which has an inside diameter of 2 inches and a filter length of 18 inches sits on a ridge in the filter tower 200, held in place by a spring handle 302 by the filter tower cap 303. The tower cap retained by a clamp assembly 304 which, in the present embodiment, is Item 77230ES as manufactured by Tyco Fire Products of Lansdale, Pa. Ammonia vapor passing through the filter 301 exits to the annular space outside the filter 301 near the top of the filter 301. Liquid passing through the filter 301 exits to the annular space outside the filter 301 near the bottom of the filter 301. Ammonia vapor exits the filter tower 200 to the vapor exhaust tower 201 through an upper pipe 305. The vapor exhaust tower 201 in the preferred embodiment is 4 inches inside diameter and 24 inches tall. Liquid ammonia exits vapor exhaust assembly 102 to the vapor exhaust tower 201 through a lower pipe 306. Liquid ammonia passes through the vapor exhaust assembly 102 over a dam top edge 314 of a dam 307 to an exit 308 and thence to the control section of the application system. Vapor exits the vapor exhaust assembly 102 through a solenoid operated valve 204. The solenoid valve 204 is switched off and on to control the liquid ammonia level in the exhaust tower 201 by a float switch 312. The solenoid valve 204 and the float switch 312 are held in place by a cap 311 on the vapor exhaust assembly 102. The tower cap 311 is retained by a clamp assembly 310 which, in the present embodiment, is Item 77240ES as manufactured by Tyco Fire Products of Lansdale, Pa.

Figure 4B:
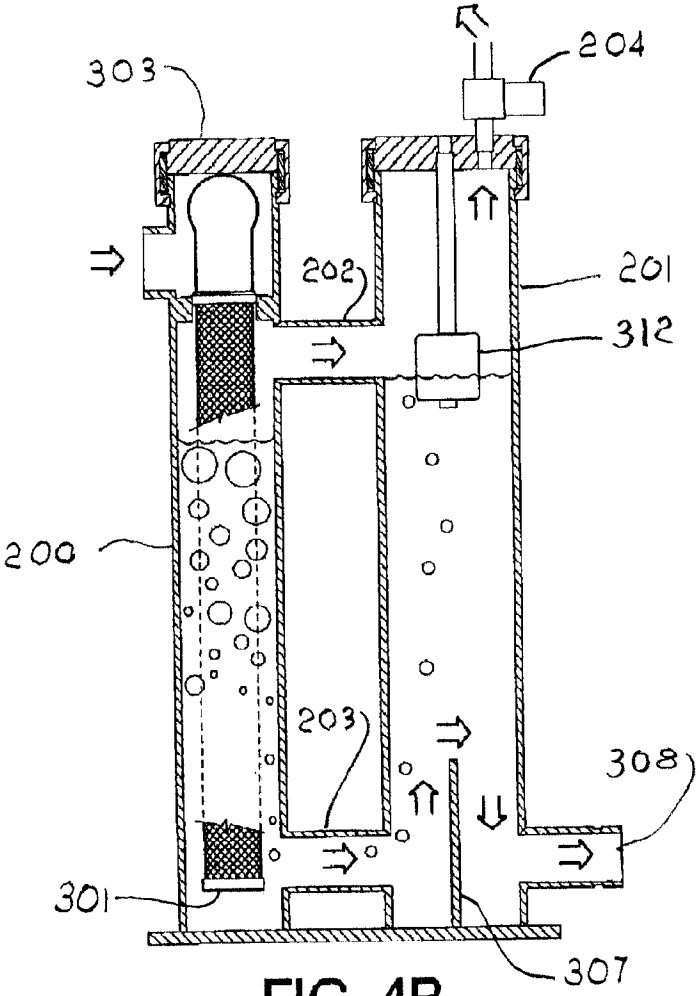
FIG. 4B is a diagrammatic cross section of the preferred embodiment of the present invention.
Figure 4A:
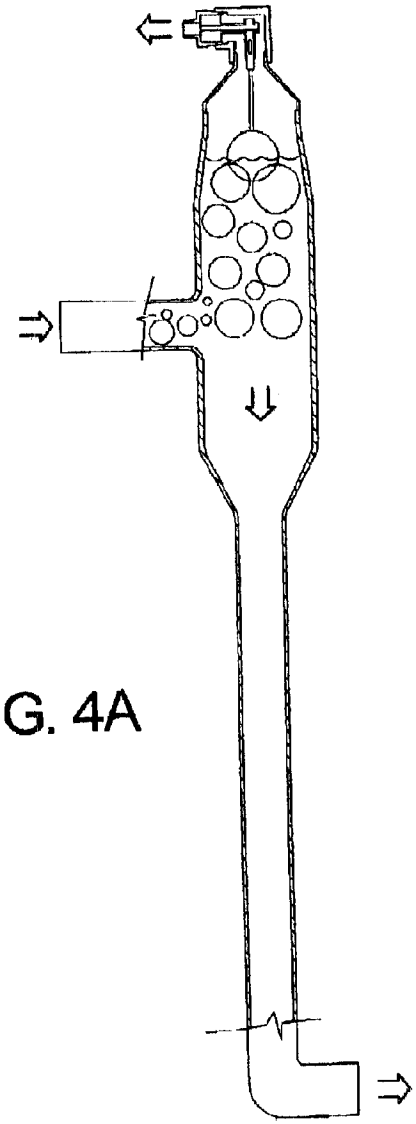
FIG. 4A is a diagrammatic cross section of prior art.

Referring to FIGS. 4A and 4B, FIG. 4A is a diagrammatic cross section of prior art. FIG. 4B is a diagrammatic cross section of the preferred embodiment of the present invention. As shown in FIG. 4A, ammonia vapor bubbles in the incoming stream pass by the float controlling exit of vapor from the tower. Vapor which is produced by pressure drop from tank usually ranges from 20 volume percent to 70 volume percent at this location. Turbulence at the level control float is increased as the volume percent of vapor increases. When an increase in vapor causes the vapor flow to be larger than can be exited from the tower, separation fails. FIG. 4B illustrates the vapor migration from the filter to annular space outside the filter and then to the top of the vapor exhaust tower. If small amounts of vapor are entrained with the liquid stream to the bottom of the vapor exhaust tower, they encounter the dam at the bottom of the tower and are directed to the top of the tower rather than continuing to the liquid exit 308 from the vapor exhaust tower.

I claim:

1. An anhydrous ammonia fertilizer liquid and vapor separator comprising:

a liquid anhydrous ammonia storage tank pressurized by anhydrous ammonia vapor pressure;

a vapor exhaust assembly connected to the liquid anhydrous ammonia storage tank by a delivery conduit and delivering anhydrous ammonia to an ammonia flow meter connected to the anhydrous ammonia liquid and vapor separator by a liquid ammonia exit conduit;

a distribution manifold connected to the ammonia flow meter and receiving liquid ammonia from the ammonia flow meter;

a plurality of hoses connected to the distribution manifold each of which receives liquid ammonia from the distribution manifold and delivers ammonia to a soil cutting knife for injection into soil;

wherein the vapor exhaust assembly includes a filter tower with a filter tower vertical tube, a tube closed top, a tube closed bottom, a stainless steel filter tube inside the filter tower vertical tube, a filter tower inlet through the filter tower vertical tube below the tube closed top and above filter open top end of the stainless steel filter screen tube, a filter tower liquid ammonia outlet through the filter tower vertical tube above the tube closed bottom and adjacent to a filter closed bottom end of the stainless steel filter tube; and wherein the vapor exhaust assembly also includes a vapor exhaust tower with an exhaust tower vertical tube, an exhaust tower closed bottom, an exhaust tower closed top, an exhaust tower liquid ammonia inlet above the exhaust tower closed bottom and connected to the filter tower liquid ammonia outlet, a dam connected to the vapor exhaust tower closed bottom, an exhaust tower inside wall, and having a dam top edge that all liquid ammonia passing through the exhaust tower liquid ammonia inlet passes above, the liquid ammonia exit conduit through the exhaust tower vertical tube located below the dam top edge and on a downstream side of the dam, an ammonia vapor upper pipe connected to the filter tower below the filter open top end of the stainless steel filter tube and connected to the exhaust tower vertical tube above the dam top edge, a vapor discharge valve attached to the exhaust tower closed top, a vapor discharge tube connected to the vapor discharge valve and extending to one of the soil cutting knives, and an ammonia liquid level sensor attached to the exhaust tower closed top and operable to open the vapor discharge valve when an upper surface of liquid ammonia falls below a selected elevation.

2. An anhydrous ammonia fertilizer liquid and vapor separator, as set forth in claim 1, wherein the tube closed top of the filter tower is closed by a filter tower cap and the filter tower cap is openable for removal of the stainless steel filter tube.

3. An anhydrous ammonia liquid and vapor separator, as set forth in claim 1, wherein the exhaust tower closed top is closed by an exhaust tower cap that is openable.

4. An anhydrous ammonia liquid and vapor separator, as set forth in claim 1 wherein the ammonia liquid level sensor also controls an ammonia upper liquid surface elevation in the filter tower.

5. An anhydrous ammonia liquid and vapor separator, as set forth in claim 1, wherein ammonia vapor that forms in the liquid ammonia which enters the exhaust tower through the exhaust tower liquid ammonia inlet, is separated from liquid ammonia in the exhaust tower.

6. An anhydrous ammonia liquid vapor separator, as set forth in claim 1 wherein a filter tower ammonia vapor chamber is provided between the tube closed top and a filter tower position below the ammonia vapor upper pipe;

a vapor exhaust tower ammonia vapor chamber between the exhaust tower closed top and a vapor exhaust tower position below the ammonia vapor upper pipe; and wherein ammonia vapor passes from the filter tower ammonia vapor chamber through the ammonia vapor upper pipe, into the exhaust tower ammonia vapor chamber and through the vapor discharge valve without disturbing liquid ammonia in the vapor exhaust tower.

*7. An anhydrous ammonia fertilizer vapor exhaust assembly in communication with a supply of anhydrous ammonia, the anhydrous ammonia comprising ammonia vapor and liquid ammonia, the assembly comprising:*

*a first chamber having an upper end and a lower end, the anhydrous ammonia from the supply of anhydrous ammonia entering the first chamber, wherein a portion of the ammonia vapor is separated from the liquid ammonia in the first chamber; and*

*a second chamber having an upper end and a lower end, the upper end of the first chamber fluidly connected to the upper end of the second chamber via an upper passage, the lower end of the first chamber fluidly connected to the lower end of the second chamber via a lower passage;*

*wherein the liquid ammonia in the first chamber passes from the first chamber into the second chamber through the lower passage and the portion of the ammonia vapor separated in the first chamber passes into the upper end of the second chamber through the upper passage;*

*wherein a further portion of the ammonia vapor is separated from the liquid ammonia in the second chamber; and*

*wherein the separated portions of the ammonia vapor are exhausted through the upper end of the second chamber, and wherein the liquid ammonia exits through a liquid outlet in the lower end of the second chamber.*

*8. The anhydrous ammonia fertilizer vapor exhaust assembly of claim 7, further comprising a structure disposed in the second chamber to redirect the liquid ammonia communicated into the second chamber such that entrained ammonia vapor within the liquid ammonia in the second chamber encounters the structure causing the entrained ammonia vapor to be directed away from the liquid outlet.*

*9. The anhydrous ammonia fertilizer vapor exhaust assembly of claim 8, wherein the structure is a dam whereby the liquid ammonia passes over the dam before exiting through the liquid outlet.*

*10. The anhydrous ammonia fertilizer vapor exhaust assembly of claim 7, wherein the first chamber includes a filter through which the anhydrous ammonia flows upon entering the first chamber.*

*11. An anhydrous ammonia fertilizer vapor exhaust assembly in communication with a supply of anhydrous ammonia, the anhydrous ammonia comprising ammonia vapor and liquid ammonia, the assembly comprising:*

*a first chamber having an upper end and a lower end, a portion of the ammonia vapor is separated from the liquid ammonia in the first chamber, wherein the portion of the separated ammonia vapor is exhausted at the upper end of the first chamber; and*

*a second chamber having an upper end and a lower end, a further portion of the ammonia vapor is separated from the liquid ammonia in the second chamber, whereby the further portion of the separated ammonia vapor is exhausted at the upper end of the second chamber;*

*an upper passage fluidly connecting the first chamber and the second chamber proximate the upper ends of the first and second chambers;*

*a lower passage fluidly connecting the first chamber and the second chamber proximate the lower ends of the first and second chambers;*

*a liquid level sensor that cooperates with a valve to regulate the level of liquid ammonia in the second chamber; and*

*wherein the liquid ammonia exits through a liquid outlet in the lower end of the second chamber.*

*12. An anhydrous ammonia fertilizer vapor exhaust assembly in communication with a supply of anhydrous ammonia, the anhydrous ammonia comprising ammonia vapor and liquid ammonia, the assembly comprising:*

*a first chamber having an upper end and a lower end, the anhydrous ammonia from the supply of anhydrous ammonia entering the first chamber, and wherein a portion of the ammonia vapor is separated from the liquid ammonia in the first chamber;*

*a second chamber having an upper end and a lower end, the upper end of the second chamber fluidly connected to the upper end of the first chamber via an upper passage, the lower end of the second chamber fluidly connected to the lower end of the first chamber via a lower passage, wherein the portion of the ammonia vapor separated in the first chamber passes into the upper end of the second chamber via the upper passage, and wherein the liquid ammonia from the first chamber enters the lower end of the second chamber via the lower passage; and*

*a structure disposed in the lower end of the second chamber to redirect the liquid ammonia entering the lower end of the second chamber such that entrained ammonia vapor within the liquid ammonia encounters the structure causing the entrained ammonia vapor to be directed away from a liquid outlet in the lower end of the second chamber;*

*wherein the separated portions of the ammonia vapor are exhausted through an exhaust outlet in the upper end of the second chamber and wherein the liquid ammonia exits through the liquid outlet.*

*13. The anhydrous ammonia fertilizer vapor exhaust assembly of claim 11, wherein the structure is a dam and whereby the liquid ammonia passes over the dam before exiting through the liquid outlet.*

*14. The anhydrous ammonia fertilizer vapor exhaust assembly of claim 11, wherein the first chamber includes a filter through which the anhydrous ammonia flows upon entering the first chamber.*

*15. An anhydrous ammonia fertilizer vapor exhaust assembly in communication with a supply of anhydrous ammonia, the anhydrous ammonia comprising ammonia vapor and liquid ammonia, the assembly comprising:*

*a first chamber in which a portion of the ammonia vapor is separated from the liquid ammonia;*

*a second chamber into which the liquid ammonia from the first chamber enters via a lower passage connecting lower ends of the first chamber and second chamber; and*

*a structure disposed in the second chamber to redirect the liquid ammonia entering the second chamber via the lower passage, such that entrained ammonia vapor within the liquid ammonia encounters the structure causing the entrained ammonia vapor to be directed away from a liquid outlet in a lower end of the second chamber; and*

*a liquid level sensor that cooperates with a valve to regulate the level of liquid ammonia in the second chamber;*

*wherein the separated portions of the ammonia vapor are exhausted through an exhaust outlet in communication with upper ends of the first and second chambers and wherein the liquid ammonia exits through the liquid outlet.*

*16. An anhydrous ammonia fertilizer vapor exhaust assembly in communication with a supply of anhydrous ammonia, the anhydrous ammonia comprising ammonia vapor and liquid ammonia, the assembly comprising:*

*a first chamber;*

*a second chamber;*

*an upper passage fluidly connecting an upper end of the first chamber to an upper end of the second chamber; and*

*a lower passage fluidly connecting a lower end of the first chamber to a lower end of the second chamber;*

*wherein, in the first chamber, a portion of the ammonia vapor is separated from the liquid ammonia, and whereby the portion of the ammonia vapor separated in the first chamber passes from the upper end of the first chamber into the upper end of the second chamber through the upper passage and the liquid ammonia in the lower end of the first chamber passes into the lower end of the second chamber through the lower passage;*

*wherein, in the second chamber, a further portion of the ammonia vapor is separated from the liquid ammonia and the portions of the ammonia vapor separated in the first and second chambers from the liquid ammonia are exhausted through an exhaust outlet in the upper end of the second chamber, and the liquid ammonia exits from the lower end of the second chamber through a liquid outlet.*

*17. The anhydrous ammonia fertilizer vapor exhaust assembly of claim 16, further comprising a structure disposed in the lower end of the second chamber to redirect the liquid ammonia passing into the lower end of the second chamber such that entrained ammonia vapor within the liquid ammonia encounters the structure causing the entrained ammonia vapor to be directed away from the liquid outlet.*

*18. The anhydrous ammonia fertilizer vapor exhaust assembly of claim 16, wherein the structure is a dam and whereby the liquid ammonia passes over the dam before exiting through the liquid outlet.*

*19. The anhydrous ammonia fertilizer vapor exhaust assembly of claim 16, wherein the first chamber includes a filter through which the anhydrous ammonia flows upon entering the first chamber.*

*20. An anhydrous ammonia fertilizer vapor exhaust assembly in communication with a supply of anhydrous ammonia, the anhydrous ammonia comprising ammonia vapor and liquid ammonia, the assembly comprising:*

*a first chamber;*

*a second chamber;*

*an upper passage fluidly connecting the first chamber to the second chamber proximate upper ends of the first and second chambers; and*

*a lower passage fluidly connecting the first chamber to the second chamber proximate lower ends of the first and second chambers;*

*wherein, in the first chamber, a portion of the ammonia vapor is separated from the liquid ammonia, the separated ammonia vapor passing from the first chamber to the second chamber through the upper passage and the liquid ammonia having further ammonia vapor passing from the first chamber to the second chamber through the lower passage;*

*wherein, in the second chamber, the further ammonia vapor is separated from the liquid ammonia in the second chamber, and whereby the portion of the ammonia vapor separated in the first chamber and the further ammonia vapor separated in the second chamber are exhausted through an exhaust outlet in communication with the upper ends of the first chamber and the second*

*chamber, and wherein the liquid ammonia exits from the second chamber through a liquid outlet in the lower end of the second chamber;*

*a liquid level sensor that cooperates with a valve to regulate the level of liquid ammonia in the second chamber.*

*21. An anhydrous ammonia fertilizer liquid and vapor separator, comprising:*

*a first tower having an upper end and a lower end, the first tower receiving an incoming ammonia stream comprising liquid ammonia with entrained ammonia vapor, the first tower pre-separating the incoming ammonia stream into separate gaseous and liquid streams;*

*a second tower having an upper end and a lower end, the upper end of the first tower fluidly connected to the upper end of the second tower by an upper passage, the lower end of the first tower fluidly connected to the lower end of the second tower by a lower passage;*

*wherein the gaseous stream pre-separated in the first chamber passes from the upper end of the first tower into the upper end of the second tower through the upper passage;*

*whereby, upon the liquid stream from the lower end of the first tower entering the lower end of the second tower through the lower passage, the liquid stream is redirected such that entrained ammonia vapor within the liquid stream is directed away from a liquid outlet in the second tower.*

*22. The anhydrous ammonia fertilizer liquid and vapor separator of claim 21 wherein a dam is disposed within the second tower to cause the redirection of the liquid stream and wherein the liquid stream passes over the dam before exiting the liquid outlet in the second tower.*

*23. The anhydrous ammonia fertilizer liquid and vapor separator of claim 21, wherein the first tower includes a filter through which the incoming ammonia stream passes.*

*24. An anhydrous ammonia fertilizer liquid and vapor separator, comprising:*

*a first tower receiving an incoming ammonia stream comprising liquid ammonia with entrained ammonia vapor, the first tower pre-separating the incoming ammonia stream into separate gaseous and liquid streams;*

*a second tower receiving the liquid stream from the first tower via a lower passage connecting a lower end of the first tower with a lower end of the second tower;*

*a liquid level sensor that cooperates with a valve to regulate the gaseous and liquid streams in the second tower;*

*whereby, upon the liquid stream entering the second tower via the lower passage, the liquid stream is redirected such that entrained ammonia vapor within the liquid stream is directed away from a liquid outlet, and whereby the pre-separated gaseous stream in the first tower and the entrained ammonia vapor separated in the second tower are exhausted from upper ends of the first tower and second tower.*

*25. An anhydrous ammonia fertilizer liquid and vapor separator, comprising:*

*a first tower receiving an incoming ammonia stream comprising liquid ammonia with entrained ammonia vapor, the first tower pre-separating the incoming ammonia stream into separate gaseous and liquid streams;*

*a second tower receiving the liquid stream from the first tower;*

*whereby, upon the liquid stream entering the second tower, the liquid stream is redirected such that entrained ammonia vapor within the liquid stream is directed away from a liquid outlet; and*

*wherein the separated gaseous and liquid streams are separately received from the first tower through respective upper and lower passages connecting the first tower and the second tower.*

*26. The anhydrous ammonia fertilizer liquid and vapor separator of claim 21, wherein at least a portion of the entrained ammonia vapor in the liquid stream entering the second tower through the lower passage is separated from the liquid stream in the second tower.*

*27. The anhydrous ammonia fertilizer liquid and vapor separator of claim 26, wherein the gaseous stream and separated ammonia vapor is vented through an exhaust outlet in the second tower.*

* * * * *